(12) United States Patent
Carre et al.

(10) Patent No.: US 8,894,351 B2
(45) Date of Patent: Nov. 25, 2014

(54) RETAINING RING

(75) Inventors: Yolaine Carre, Villeneuve Saint Georges (FR); Mathieu Jean Pierre Trohel, Saint Vrain (FR)

(73) Assignee: Snecma, Paris (FR)

( * ) Notice: Subject to any disclaimer, the term of this patent is extended or adjusted under 35 U.S.C. 154(b) by 795 days.

(21) Appl. No.: 13/188,792

(22) Filed: Jul. 22, 2011

(65) Prior Publication Data

US 2012/0020796 A1 Jan. 26, 2012

(30) Foreign Application Priority Data

Jul. 22, 2010 (FR) ...................................... 1056021

(51) Int. Cl.
*F01D 5/08* (2006.01)
*B64C 11/06* (2006.01)
*F02K 3/072* (2006.01)
*F04D 29/34* (2006.01)
*B64D 27/02* (2006.01)

(52) U.S. Cl.
CPC ................ *B64C 11/06* (2013.01); *Y02T 50/672* (2013.01); *Y02T 50/66* (2013.01); *F02K 3/072* (2013.01); *B64D 2027/026* (2013.01)
USPC ....................... 415/115; 416/97 R; 416/220 R

(58) Field of Classification Search
CPC ........... F01D 5/06; F01D 5/08; F01D 5/3023; F04D 19/002; F04D 29/322; F04D 29/323; F04D 29/325; F04D 29/329; F04D 29/362; F04D 29/5826; B64C 11/04; B64C 11/06; B64C 11/30; B64D 2027/026
USPC ..... 415/97 R, 205, 220 R, 248; 416/115, 130
See application file for complete search history.

(56) References Cited

U.S. PATENT DOCUMENTS

| 4,732,538 A | * | 3/1988 | Wollenweber et al. ......... 416/94 |
| 4,863,352 A | * | 9/1989 | Hauser et al. ............. 416/204 R |
| 5,112,191 A | * | 5/1992 | Strock et al. .................... 416/94 |

* cited by examiner

*Primary Examiner* — Edward Look
*Assistant Examiner* — Jason Davis
(74) *Attorney, Agent, or Firm* — Pillsbury Winthrop Shaw Pittman LLP

(57) ABSTRACT

A retaining ring presenting, on its periphery, a plurality of radial bores, each of the bores being able to receive a blade root. The retaining ring also includes at least one first radial opening traversed by a compression tube and at least one second radial opening, the at least first radial opening and the at least second radial opening being separated from each other by at least one of the bores of the plurality of radial bores. The ventilation device finds a particularly interesting application in the field of turbine engines including a pusher open rotor.

9 Claims, 4 Drawing Sheets

RETAINING RING

CROSS REFERENCE TO RELATED APPLICATION

This application claims priority to French Patent Application No. 1056021, filed Jul. 22, 2010, the entire content of which is incorporated herein by reference in its entirety.

FIELD

The invention relates to a retaining ring with at least one blade root. The invention more particularly applies to a retaining ring comprising a ventilation system for at least one of the blade roots of a pusher open rotor equipping a turbine engine.

BACKGROUND

Conventionally, a pusher open rotor is especially constituted of two propellers, each comprising a retaining ring equipped with a plurality of blades. As represented in FIG. 1, a propeller 1 is generally formed by a retaining ring 2 (typically in titanium or composite material) comprising a plurality of radial bores 3 uniformly distributed at its periphery. Each radial bore 3 is adapted to receive a root 4 of a blade 5 equipped with a pivot 6 (also called blade root pivot).

However, a configuration such as described above is likely to present some disadvantages. In fact, propeller 1 constitutes a disk with a relatively high mass that must resist the centrifugal forces applied to it when the propeller shaft rotates. Furthermore, such mass is increased by the metal blade roots 4. In addition, this high mass generates, for the airplane, high fuel consumption.

To reduce this high mass, it is possible to use blades 5 in which the root 4 is in a composite material. In fact, the utilization of such material enables the mass of the assembly formed by the retaining ring 2 and blades 5 to be reduced.

However, airplanes equipped with a pusher open rotor 7 whose propellers 1 are situated at the rear present a primary stream 9 in which gases that may exceed 500 degrees circulate, this primary stream 9 being situated below and near the blade 5 roots 4 (see FIG. 2). Consequently, roots 4 of blade 5 are subjected to high temperatures.

A disadvantage resides in the fact that composite materials don't resist high temperatures very well and deteriorate rapidly. Therefore, the lifetime of a blade comprising a root in a composite material is limited.

SUMMARY

More particularly, an aspect of the invention is to remedy the disadvantages of the aforementioned devices. In this context, an embodiment of the invention aims to propose a device reducing the weight of a propeller while ensuring a long lifetime for the blades that the propeller comprises. In general, an embodiment of the invention aims to cool the lower part of the blade roots of a propeller.

An aspect of the invention applies to a retaining ring comprising at least one blade root presenting, on its periphery, a plurality of radial bores, each of said bores being able to receive a blade root.

In addition, said retaining ring comprises at least one first radial opening traversed by a compression tube and at least one second radial opening, said at least one first radial opening and said at least one second radial opening being separated from each other by at least one of the bores of said plurality of radial bores.

For the rest of the description, radial opening is understood to refer to an opening whose axis of revolution is substantially coaxial with one of the radius of the retaining ring.

For the rest of the description, tube is understood to refer to a hollow cylinder of linear section, the inner diameter of the tube may be constant.

For the rest of the description, compression vortex is understood to refer to a rotation movement of the air situated in the tube around the axis of revolution of the tube. This movement enables the air situated below the compression tube to be aspirated.

Thanks to this feature, the air may circulate through the second opening to pass from the outside of the ring to the inside of the ring and then through the first opening to pass from the inside of the ring to the outside of the ring.

When the retaining ring is equipped with a plurality of blades, each blade root forms an integral part with a pivot and is positioned in one of said radial bores. When the propulsion assembly rotates, each blade compresses and expels the air at its root. This compressed air circulates in the region of the upper part of the blade root and then part of this compressed air passes, via the second opening, in the region of the lower part of the blade root. Thanks to this air system, the upper part and the lower part of the blade root are cooled.

Preferably, in an embodiment, said first radial opening is positioned upstream from said retaining ring and said second radial opening is positioned downstream from said retaining ring.

According to an advantageous embodiment of the retaining ring, the retaining ring comprises a mask covering at least one blade root, said mask presenting a cavity to allow a flow to circulate under said retaining ring.

Thanks to this mask, when the retaining ring is rotating, a compression vortex is created in the radial tube that traverses the first upstream radial opening. This compression vortex aspirates the air found in the lower cavity, formed by the mask and the inner surface of the retaining ring, to then expel it to the outside. The vortex also enables the exterior air to be aspirated via said at least one second downstream radial opening. In other words, the compression vortex enables the air from the outside to circulate under the blade root.

In addition to the principal characteristics that have just been mentioned in the previous paragraph, the retaining ring equipped with at least one blade root according to an embodiment of the invention may present one or more of the additional characteristics below, considered individually or according to all technically feasible combinations:
- said mask forms an internal ring with a U-shaped section, the upper part of said U-shaped section being covered by said retaining ring;
- each blade root is covered by a mask;
- for each radial bore, a first opening and a second opening are placed opposite each other, said first opening and said second opening are separated from each other by said radial bore;
- said second opening of said retaining ring comprises a diameter greater than the diameter of said first opening, this characteristic limiting the pressure drops through said first opening;
- said tube comprises a length greater than the length of said second opening, this difference in length being necessary for creating said compression vortex.

Another aspect of the invention is a turbine engine comprising a pusher open rotor, this turbine engine comprising a retaining ring according to at least one of the aforementioned embodiments.

BRIEF DESCRIPTION OF THE DRAWINGS

Other characteristics and advantages of the invention will clearly emerge from the description given below, for indicative and in no way limiting purposes, with reference to the attached figures, among which.

DETAILED DESCRIPTION OF EMBODIMENTS

For reasons of clarity, only the elements useful for understanding the invention have been represented, without respecting the scale and schematic manner. In addition, the same elements found on different figures bear identical references.

Figure 1:
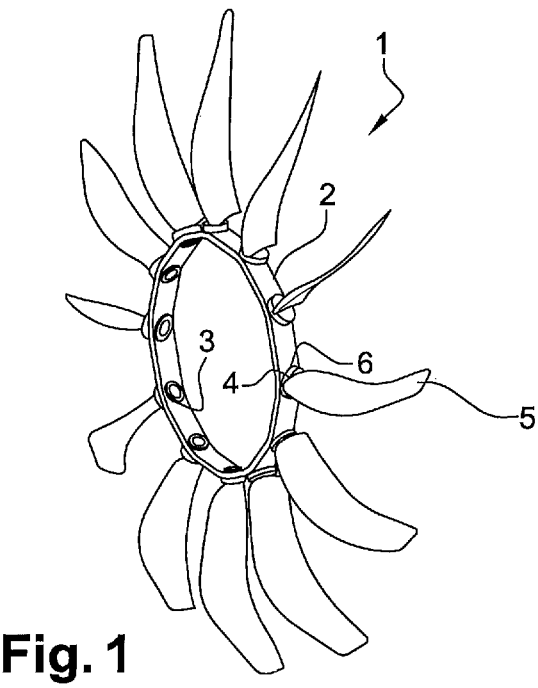
FIG. 1 represents a propeller comprising a retaining ring equipped with blades according to the prior art.
Figure 2:
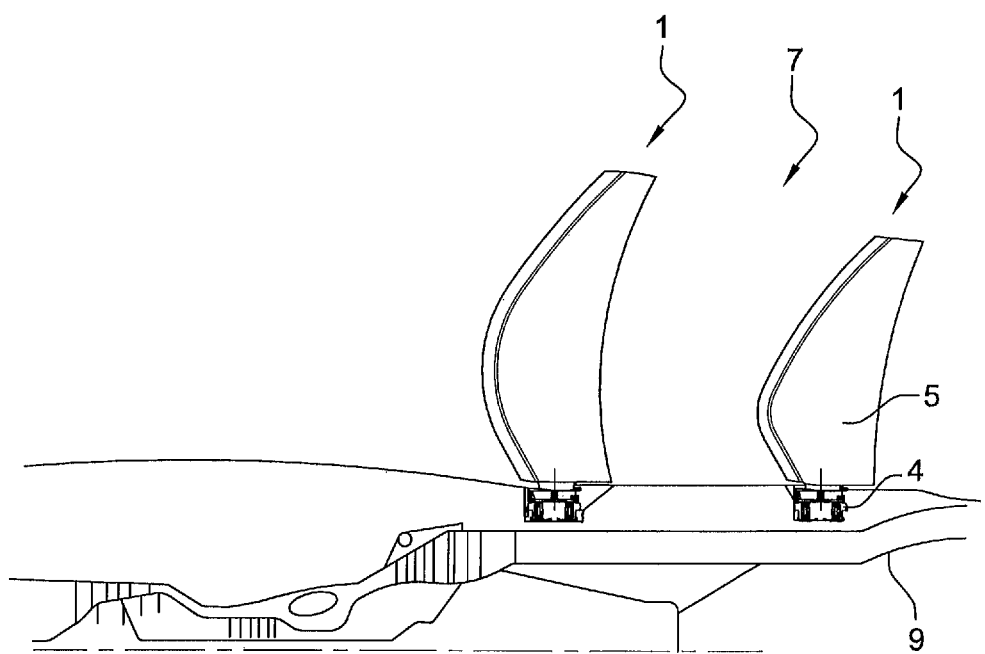
FIG. 2 represents part of a pusher open rotor comprising two propellers similar to that represented in FIG. 1.

FIGS. 1 and 2 were described previously with reference to the prior art.

Figure 3:
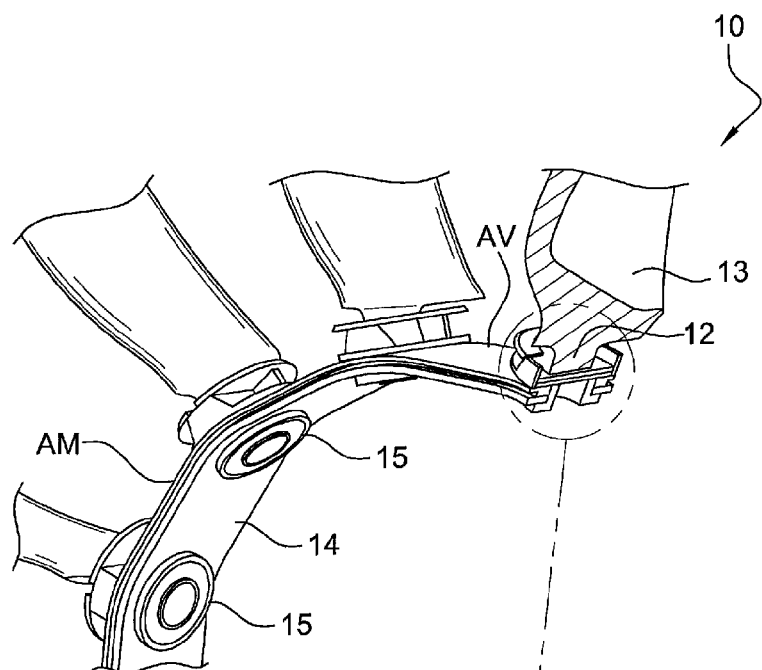
FIG. 3 represents a partial view of a propeller equipped with a retaining ring according to an embodiment of the invention.

FIG. 3 schematically illustrates a partial view of a propeller 10 comprising a retaining ring 14 equipped with at least one blade 13 root 12. Propeller 10 is suitable for being rotated via a propeller shaft (not represented) at a high-speed, for example on a pusher open rotor turbine engine of an airplane. Propeller 10 comprises a retaining ring 14 equipped with a plurality of radial bores 15, each comprising a blade 13 root 12.

Figure 4:
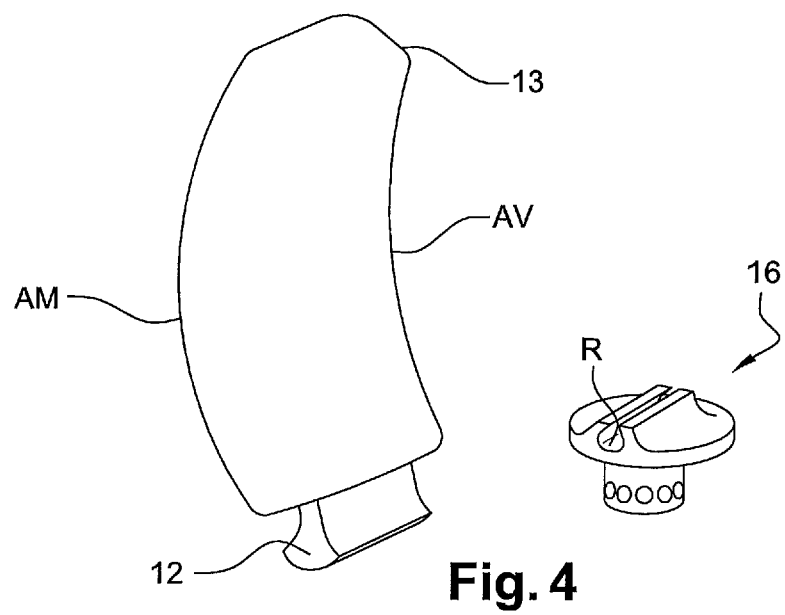
FIG. 4 represents a possible assembly between a blade root and a blade root pivot.

In a non-limiting manner, a blade 13 may present a dovetail type root 12 (see FIG. 4), in this embodiment the blade 13 root 12 is mounted in a groove R that comprises a blade 13 root 12 pivot 16.

Figure 5:
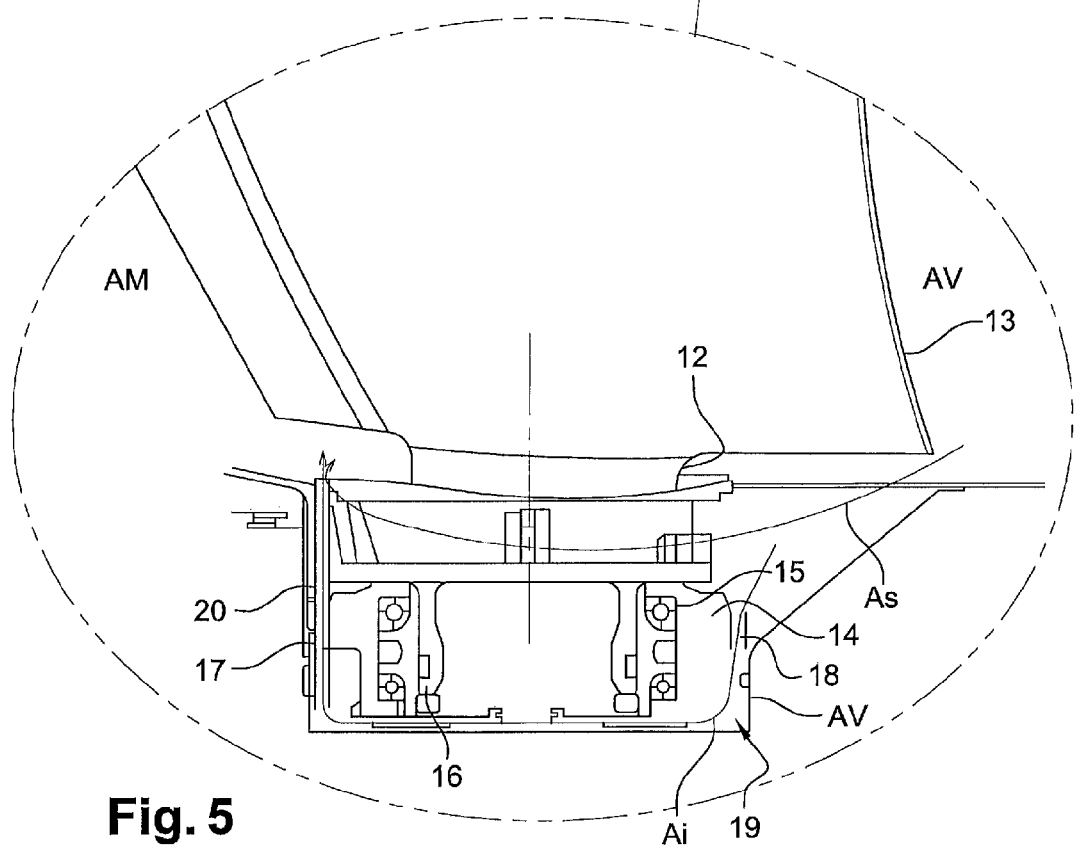
FIG. 5 represents an enlargement of part of the retaining ring according to an embodiment of the invention represented in FIG. 3.

In the example represented in FIGS. 3 and 5, each blade 13 root 12 is integral with a pivot 16, each assembly (pivot 16 and root 12) being inserted in a radial bore 15. More particularly, FIG. 5 represents an enlargement of part of the partial view illustrated in FIG. 3.

The retaining ring 14 according to an embodiment of the invention represented in FIG. 5 comprises:
 a radial bore 15,
 a first upstream radial opening 17,
 a second downstream radial opening 18,
 a mask 19,
 A tube 20.
 For the rest of the description:
 upstream UP is understood to refer to the end of the retaining ring 14 situated in the region of the leading edge of blades 13;
 downstream DO is understood to refer to the end of the retaining ring 14 situated in the region of the trailing edge of blades 13.

When blade 13 is subjected to a rotation movement, it compresses the air and expels part of this air at its root 12.

At the same time, when retaining ring 14 is rotated, a compression vortex is created within tube 20 situated in the region of the first opening 17. This compression vortex enables the air found below the blade 13 root 12 to be aspirated, and then forces the exterior air (i.e., at the periphery of the retaining ring 14) situated at the region of blade 13 root 12, through the second opening 18 to be found between mask 19 and retaining ring 14. This air is then expelled to the outside via compression tube 20.

In other words, the first opening 17 traversed by the compression tube 20, the second opening 18 and the mask 19 enable a ventilation system to be created to cool blade 13 root 12 and pivot 16. More particularly, the ventilation system thus created enables the lower part of blade 13 root 12 to be cooled.

In a particularly interesting manner, tube 20 situated in the region of the first upstream opening 17 presents a length (or height) greater than the length (or height) of the second downstream opening 18, the length (or height) of the second opening 18 being formed by the thickness of retaining ring 14. This feature ensures that the compression of the compression vortex, generated by tube 20, is greater than the pressure release generated by the second opening 18.

Tube 20 may, for example, present a length on the order of 14 cm and an inner diameter on the order of 1 cm.

In summary, thanks to an embodiment of the invention, an upper air system As and a lower air system Ai is generated to cool blade 13 root 12.

The upper air system As is generated by blade 13 itself that compresses part of the downstream air to direct it to its root 12.

Lower air system Ai is generated by tube 20 in the region of the first opening 17 that, when retaining ring 14 is subjected to a rotation movement, creates a compression vortex enabling, on the one hand, the air situated in the lower cavity formed by mask 19 to be aspirated and, on the other hand, to force, via the second opening 18, part of the air found at blade 13 root 12 to penetrate into mask 19.

Figure 6A:
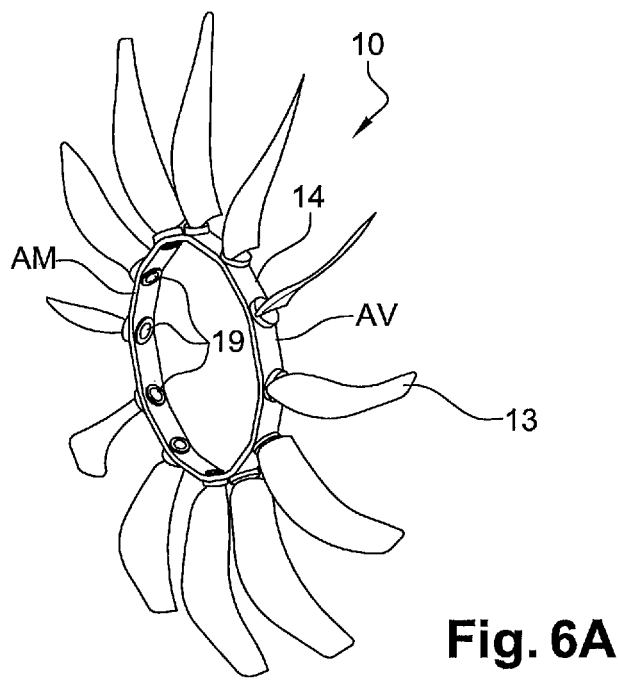
FIGS. 6A and 6B illustrate two possible embodiments of masks enabling ventilation of the lower part of the blade roots.

In an embodiment represented in FIG. 6A, a mask 19 is placed under each blade 13 root 12. Each mask 19 may be made secured with the retaining ring 14 by any means such as, for example, screwing or welding.

Figure 6B:
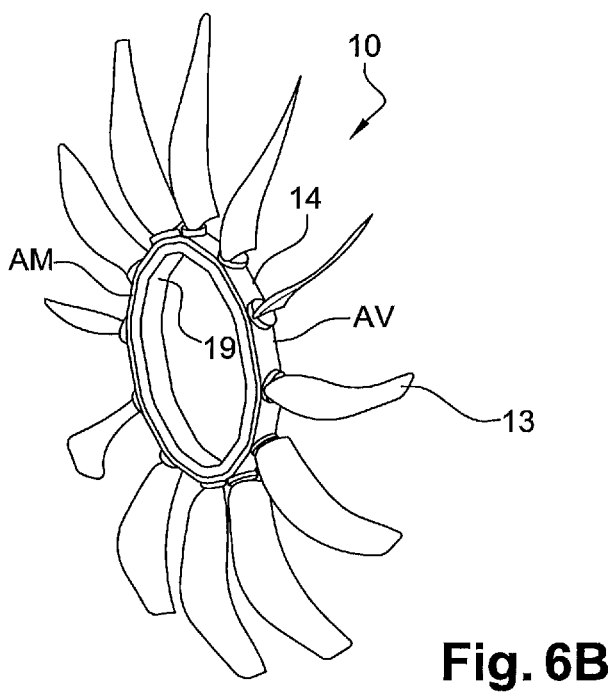

In another embodiment represented in FIG. 6B, a single mask 19 is used to protect the blade 13 roots 12 assembly. In this embodiment, mask 19 is formed by a ring presenting a U-shaped section whose top is covered by the retaining ring 14. It is therefore possible to use a single first opening 17 and a single second opening 18 to create a ventilation system enabling the blade 13 roots 12 assembly to be ventilated.

In a particularly interesting manner, each radial bore 15 is surrounded by a first opening 17 comprising a tube 20 and a second opening 18. This embodiment generates a ventilation system for each root 12 that is inserted in a radial bore 15. It follows that each root 12 is efficiently cooled.

According to a non-illustrated embodiment, mask 19 has a U-shaped section as represented in FIG. 6B, mask 19 being divided into several cavities so as to create a cavity for each blade 13 root 12. Each part of retaining ring 14 covering a cavity comprises a radial bore 15, a first opening 17 and a second opening 18. This modality enables a single mask 19 to be used for the blade 13 root 12 assembly mounted on the retaining ring 14 and promotes an optimal air flow under each blade 13 root 12.

Embodiments of the invention were more particularly described in the context of turbine engines comprising a pusher open rotor. However, it is understood that the retaining ring according to embodiments of the invention applies to any type of propeller that airplanes comprise or, more generally, any type of propeller operating in a high-temperature environment.

The person skilled in the art is capable of carrying out different variations of the retaining ring 14 according to embodiments of the invention, particularly as relates to the shape of the mask 19 and the number of first openings 17 and/or second openings 18, without necessarily departing from the scope of the abovementioned invention.

The invention claimed is:

1. A retaining ring comprising:
a plurality of radial bores arranged on a periphery of the retaining ring, each of said bores being configured to receive a blade root;
at least one first radial opening traversed by a compression tube and at least one second radial opening, said at least one first radial opening and said at least one second radial opening being separated from each other by at least one of the bores of said plurality of radial bore.

2. The retaining ring according to claim 1, wherein said first radial opening is positioned upstream from said retaining ring, and said second radial opening is positioned downstream from said retaining ring.

3. The retaining ring according to claim 1, comprising a mask covering at least one blade root, said mask presenting a cavity to allow a flow to circulate under said retaining ring.

4. The retaining ring according to claim 3, wherein said mask forms an internal ring with a U-shaped section, the upper part of said U-shaped section being covered by said retaining ring.

5. The retaining ring according to claim 3, wherein each root is covered by a mask.

6. The retaining ring according to claim 1, wherein for each radial bore, a first opening and a second opening are placed opposite each other, said first opening and said second opening are separated from each other by said radial bore.

7. The retaining ring according to claim 1, wherein said second opening of said retaining ring comprises a diameter greater than the diameter of said first opening.

8. The retaining ring according to claim 1, wherein said tube presents a length greater than a length of said second opening.

9. A turbine engine comprising a pusher open rotor, wherein the engine comprises a retaining ring according to claim 1.

* * * * *